(12) United States Patent
Andriolo et al.

(10) Patent No.: US 12,303,862 B2
(45) Date of Patent: May 20, 2025

(54) NON-TOXIC NANOMATERIAL FOR METALS EXTRACTION

(71) Applicants: Jessica M. Andriolo, Butte, MT (US); M. Katie Hailer, Butte, MT (US); Jack L. Skinner, Butte, MT (US); Jerome P. Downey, Butte, MT (US); David L. Hutchins, Butte, MT (US); Teagan Leitzke, Butte, MT (US)

(72) Inventors: Jessica M. Andriolo, Butte, MT (US); M. Katie Hailer, Butte, MT (US); Jack L. Skinner, Butte, MT (US); Jerome P. Downey, Butte, MT (US); David L. Hutchins, Butte, MT (US); Teagan Leitzke, Butte, MT (US)

(73) Assignee: Montana Technological University, Butte, MT (US)

( * ) Notice: Subject to any disclaimer, the term of this patent is extended or adjusted under 35 U.S.C. 154(b) by 407 days.

(21) Appl. No.: 17/716,739

(22) Filed: Apr. 8, 2022

(65) Prior Publication Data

US 2022/0323928 A1 Oct. 13, 2022

Related U.S. Application Data

(60) Provisional application No. 63/172,516, filed on Apr. 8, 2021.

(51) Int. Cl.
*B01J 20/04* (2006.01)
*B01J 20/28* (2006.01)
(Continued)

(52) U.S. Cl.
CPC ....... *B01J 20/048* (2013.01); *B01J 20/28016* (2013.01); *B01J 20/3085* (2013.01);
(Continued)

(58) Field of Classification Search
CPC ............... B01J 20/048; B01J 20/28016; B01J 20/3085; B01J 20/28007; B01J 20/28009;
(Continued)

(56) References Cited

U.S. PATENT DOCUMENTS

2019/0381490 A1* 12/2019 Wang ...................... B01J 27/14

OTHER PUBLICATIONS

Mitsionis et al, "Hydroxyapatite/titanium dioxide nanocomposites for controlled photocatalytic NO oxidation", Applied Catalysis B: Environmental 106, pp. 398-404 (Year: 2011).*

(Continued)

*Primary Examiner* — Claire A Norris
(74) *Attorney, Agent, or Firm* — Mitchell J. W. Vap

(57) ABSTRACT

Fresh water contamination by heavy metals results from a variety of sources and can be damaging to wildlife, alter landscapes, and impact human health. metals removal form water sources is desirable for improving water quality and preventing adverse effects, but also for metals collection and recycling. Adsorption is a desirable metals extraction technique due to economic feasibility. Nanoscale materials exhibit high surface-area-to-volume ratio that lends to high adsorption and reactivity, making them ideal candidates for adsorptive metals extraction processes. Despite these properties, nanomaterials have elicited safety concerns. The extraordinarily small dimensions of these materials allow them to maneuver biological systems, tissues, and even cells, and combined with high reactivity, this translocation can result in toxic effects. It is therefore imperative that safety of nanomaterials for metals extraction be evaluated in addition to adsorptive properties. The current invention describes nanoparticles composed of magnetite, coated in hydroxyapatite, and functionalized for adsorption with titanium dioxide (TiHAMNPs). This material is safe, provides significant adsorption of metals, and allows efficient collection in magnetic systems.

15 Claims, 8 Drawing Sheets

A

B (51) Int. Cl.
*B01J 20/30* (2006.01)
*B01J 20/32* (2006.01)
*B09C 1/08* (2006.01)
*C02F 1/28* (2023.01)
*C02F 1/48* (2023.01)
*C02F 101/20* (2006.01)

(52) U.S. Cl.
CPC .............. *B01J 20/3295* (2013.01); *B09C 1/08* (2013.01); *C02F 1/288* (2013.01); *C02F 1/48* (2013.01); *B01J 2220/42* (2013.01); *C02F 1/281* (2013.01); *C02F 2101/20* (2013.01); *C02F 2305/08* (2013.01)

(58) Field of Classification Search
CPC ....... B01J 2220/42; C02F 1/281; C02F 1/288; C02F 2305/08; C02F 1/48
See application file for complete search history.

(56) References Cited

OTHER PUBLICATIONS

Ghaseml et al, "Magnetic Hydroxyapatite nanoparticles; an efficient adsorbent for the separation and removal of nitrate and nitrite ions from environmental samples", Journal of Separation Science, vol. 38 No. 1, pp. 164-169 (Year: 2015).*

* cited by examiner

% Removal

| Adsorption Time (min) | 157.25 MW Gadolinium | 151.96 MW Europium | 140.91 MW Praseodymium | 138.91 MW Lanthanum |
|---|---|---|---|---|
| 15 | 59.17% | 49.47% | 57.46% | 49.48% |
| 30 | 72.45% | 84.36% | 88.14% | 58.86% |
| 45 | 86.54% | 94.19% | 99.39% | 78.43% |
| 60 | 97.22% | 93.78% | 100.00% | 76.53% |
| 180 | 97.71% | 97.89% | 100.00% | 95.64% |
| 720 | 99.41% | 99.05% | 100.00% | 100.00% |
| 1440 | 95.41% | 99.38% | 100.00% | 100.00% |

*FIG. 8*

NON-TOXIC NANOMATERIAL FOR METALS EXTRACTION

CROSS-REFERENCE TO RELATED APPLICATIONS

This application claims the benefit of U.S. Provisional Application No. 63/172,516 filed on Apr. 8, 2022, the disclosure of which is hereby incorporated by reference in its entirety to provide continuity of disclosure.

STATEMENT REGARDING FEDERALLY SPONSORED RESEARCH OR DEVELOPMENT

This invention was made with government support under the EPSCoR Cooperative Agreement OIA-1757351 awarded by the National Science Foundation. The government has certain rights in the invention. Any opinions, findings, and conclusions or recommendations expressed in this material are those of the author(s) and do not necessarily reflect the views of the National Science Foundation.

THE NAMES OF THE PARTIES TO A JOINT RESEARCH AGREEMENT

Not applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

Freshwater contamination by heavy metals results a variety of sources and can be damaging to wildlife, alter landscapes, and impact human health. Heavy metals contamination can result due to proximity to paved roads where storm water runoff moves contaminants from vehicles and road treatments to soils and freshwaters (Schuler & Relyea, 2018). Mining activities have led to threaten biodiversity and genetic variation of rivers (Affandi & Ishak, 2019) and result in carcinogenic metals such as chromium being distributed into nearby freshwater sources (Obasi & Akudinobi, 2020). Additional sources of heavy metals contamination in freshwater include electroplating, metallurgy, chemical plants, and even agriculture (Yang et al., 2019a). Overtime, due to heavy metals contamination of waters and soils, a significant accumulation of these metals in the human body can occur, and therefore it is also important that wastewater be treated for heavy metals before water is returned to the environment (Amjad, Hussain, Javed, Rehman Khan, & Shahjahan, 2020; Babel & Kurniawan, 2004).

Adsorption techniques for heavy metals removal from freshwater is highly desirable due to economic feasibility (Yang et al., 2019a). Recently, nanomaterials have gained attention as a promising alternative for heavy metals adsorption (Yang et al., 2019a). Nanomaterials are attractive for research due to the presence of emergent properties that result from the high surface area-to-volume ratios of such materials. NPs are so small, that they are influenced by quantum mechanical effects (Trindade & Thomas, 2013) and often contribute to unique properties as compared to bulk materials, including an altered melting point (Gao & Gu, 2015), fluorescence (Zhong, 2009), electrical conductivity (Coetzee, Venkataraman, Militky, & Petru, 2020), and magnetic permeability (Akbarzadeh, Samiei, & Davaran, 2012). In addition, as a particulate becomes nano-sized, a larger amount of the internal material is exposed to the surface of the particle, making these components highly reactive for surface catalysis. These properties contribute to NPs exceptional adsorption capacity and reactivity (Yang et al., 2019b). Magnetic NPs in particular have garnered great interest in metals extraction processes due to the capability for magnetic collection once the particle surface is coated in the metal to be retrieved. Magnetic silica materials have been highly studied for this purpose. Previously, researchers have developed processes for coating magnetite NPs with silica to provide an adsorptive surface and demonstrated the application of these particles on an industrial scale (Deluca, Latterman, & Rosenberg, 2018; Pogorilyi et al., 2014).

Despite these encouraging results, nanomaterial distribution into the environment is itself an area of concern (Resnik, 2019). Nano-particulate exposure has resulted in significant human health problems (Arden Pope III & Dockery, 2012). Due to the small size and reactivity, such materials are small enough to penetrate organs, tissues, or even cells, and the ease with which NPs can move through living systems is concerning. Researchers have found NPs from air pollution in the frontal cortex of autopsy brain samples (Maher et al., 2016), in the urine of healthy children (Saenen et al., 2017), and even to the fetal side of the placenta (Bové et al., 2019). This exposure has resulted in lower birth weights (Pedersen et al., 2013; Slama et al., 2007), preterm birth (Ritz, Wilhelm, Hoggatt, Kay, & Ghosh, 2007; Rudra, Williams, Sheppard, Koenig, & Schiff, 2011), and intrauterine growth restriction (Liu, Krewski, Shi, Chen, & Burnett, 2007; Winckelmans et al., 2015). Polystyrene NPs (Wick et al., 2010) and silver NPs (Vidmar et al., 2018) can also reach fetal blood circulation. Other examples of side effects from NM translocation in the body include carbon nanotube (CNT) inhalation which has let to inflammation, pulmonary fibrosis, and genotoxicity. CNTs are also potential carcinogens (Pietroiusti, Stockmann-Juvala, Lucaroni, & Savolainen, 2018). Nanosilver has been shown to cause antibiotic resistance (Kaweeteerawat, Na Ubol, Sangmuang, Aueviriyavit, & Maniratanachote, 2017), can result in oxidative stress, and can have toxic effects on marine species (Massarsky, Trudeau, & Moon, 2014; Shevlin, O'Brien, & Cummins, 2018). Although vertebrate species have been exposed to naturally occurring NPs throughout time, these highly reactive particles could be more threatening than naturally occurring NPs because organisms have not had sufficient time to adapt to their unique properties (Oberdorster, Oberdorster, & Oberdorster, 2005; Savolainen et al., 2010), and some studies suggest NPs persist in the environment longer than naturally occurring NPs (Resnik & Tinkle, 2007).

These concerns make it imperative that any NPs used for heavy metals extraction processes be non-toxic and safe should they end up in soils, drinking water, or food sources. One naturally occurring NM is hydroxyapatite (HA), which is the main mineral component of vertebrate bone and teeth, where it is present as nanoscospic crystals. Synthetic HA materials have been used extensively for decades in biomedical applications due to its excellent biocompatibility and osteogenic capacity (Sadat-Shojai, Khorasani, Dinpanah-Khoshdargi, & Jamshidi, 2013). More recently, hydroxyapatite nanoparticles (HA-NPs) have been incorporated in oral care products to treat dentin hypersensitivity (DH) and promote enamel remineralization (B. Low, Allen, & Kontogiorgos, 2015; Bossù et al., 2019; Jena, Kala, & Shashirekha, 2017; Tempesti, Nicotera, Bonini, Fratini, &

Baglioni, 2018; Vano et al., 2018; Yuan et al., 2012). An article in Scientific Reports from 2019 shows that commercially available nano-HA were highly cytocompatible in vitro, and did not possess any irritation potential (Coelho, Grenho, Gomes, Quadros, & Fernandes, 2019). This study concluded that the nano-HA tested did not alter the normal behavior of the cells and therefore were safe to be used in oral care products.

Previously, synthesis of Fe-doped HA NPs (IDANPs) was accomplished (Andriolo et al., 2014, 2016, 2018, 2017). The synthesis process used required a simple wet chemical precipitation process, where ingredients were added to stirring water at room temperature.

BRIEF SUMMARY OF THE INVENTION

In this work, the synthesis process used for IDANPs was modified to produce magnetic NPs coated in HA for biocompatibility and functionalized with $TiO_2$ to improve adsorptive capacity. The novel $TiO_2$-functionalized HA-coated magnetite NPs (TiHAMNPs) were characterized, evaluated for toxicity, assessed for adsorptive capacity, and compared to commonly used silica-coated magnetite NPs (SiMNPs) used for heavy metals extraction from water.

BRIEF DESCRIPTION OF THE SEVERAL VIEWS OF THE DRAWINGS

FIG. 1. Scanning electron micrograph (A) and corresponding energy dispersive spectroscopy data (B) collected from TiHAMNPs. SEM images show TiHAMNPs were approximately round with diameters of 20-50 nm (A). Results from EDS show that TiHAMNPs are composed of expected elements including titanium and oxygen (titanium dioxide, $TiO_2$), calcium, phosphate, and oxygen (hydroxyapatite, $Ca_5(PO_4)(OH)$), and iron and oxygen (magnetite, $Fe_3O_4$) (B). An aluminum sample stub (sample holder) and gold coating were used prior to imaging and have been removed from the EDS data graph. Resolution of the EDS system was not high enough to determine actual % composition of individual NPs, but rather was used to provide confirmation of bulk elemental composition and reveal if any unexpected elements were present (none were observed).

FIG. 3. X-ray diffraction (XRD) was used to determine the crystal structure and composition of TiHAMNPs. XRD data taken directly from the instrument software (A). Rwp for all three precursors compared to TiHAMNPs was 1.35%. A preferred Rwp or Rietveld refinement value is below 10%. XRD data graphed from raw data taken from the instrument (B). Graph shows relative intensities of the precursor materials and TiHAMNPs. Collectively, XRD indicated the three individual precursors were present in the final composite TiHMNP structure.

FIG. 4. Results from XTT assay with Vero cells. The XTT assay measured metabolic enzyme release, indicating healthy cellular activity. Metabolic activity was not significantly different between TiHAMNPs and the un-treated control (p=0.791), while cells exposed to SiMNPs experienced significant diminishment (p<0.001) metabolic activity.

FIG. 6. Results of adsorption experiment. Results show that TiHAMNPs exhibited significantly higher adsorption than SiMNPs (p<0.001) and MNPs (p<0.001). After 24 hr, TiHAMNPs had reduced the amount of Cu in solution by a 73.67%, SiMNPs had reduced Cu by 30.39% and MNPs had reduced Cu by 14.05%.

FIG. 8. Depiction of the in-line metals collection system. Outline A) shows the experimental setup used for magnetic collection. In these tests, a funnel was filled and used to control flow into the rest of the system. Outline B) shows the setup used for determining any loss of NPs that might occur in the system. *Note that the magnet holder was removed for these tests. The funnel was also used for loss experiments. Outline C) delineates the entire pipeline metals collection system used to determine total Cu recovery. In the metals collection system, NP and Cu solutions are poured into the system simultaneously by opening both valves at the same time. The solutions are combined and flow continues to a manipulation stage of the system. In this embodiment, the manipulation stage is comprised of a PVC inline mixer, which improves contact between metal ions and sorbent particles. Once the solution has been sufficiently manipulated, the solution travels to the collection stage of the system, wherein the metals are collected. Samples of the depleted solution were collected leaving the system and therefore provided a direct measurement of the Cu not collected by the NPs. Results showed a collection efficiency of 46.86% through the system at a flow rate of 103.4 cm/sec and an average residence time of 0.30 sec. Magnetic collection efficiency of the particles carrying metals was 89%, and loss of particles in the system (from sticking to walls or getting lost in any openings in the system) was negligible.

DETAILED DESCRIPTION OF THE INVENTION

Figure 1:
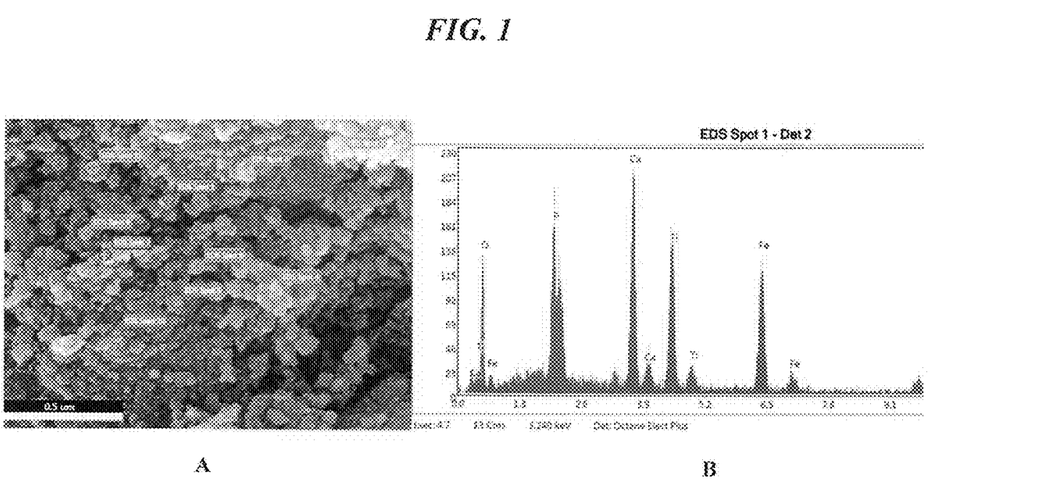
Figure 2:
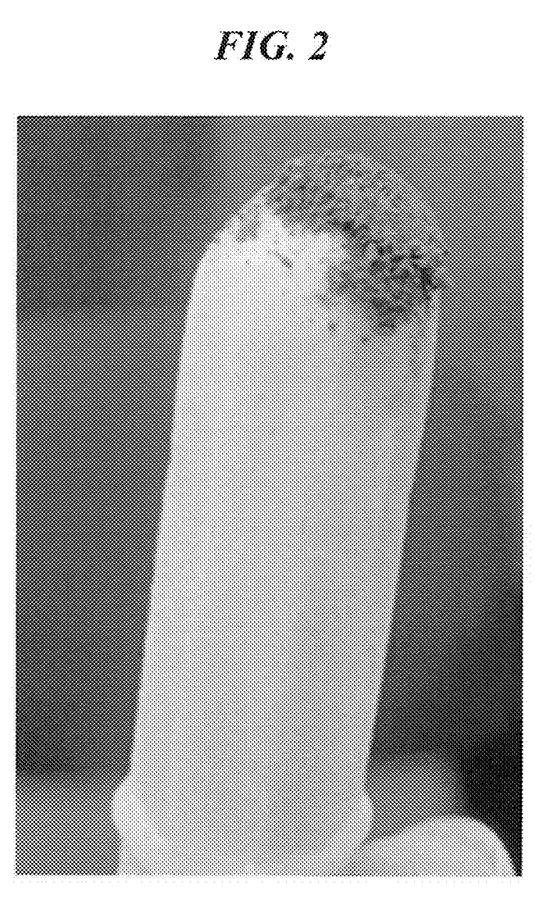
FIG. 2. Camera image of TiHAMNPs on the end of magnetic stir bar used to demonstrate magnetic properties of the NPs.

TiHAMNPs (see FIGS. 1 and 2) were synthesized by wet chemical precipitation methods. Precursors were added in the order listed:

1) 200 mL deionized $H_2O$ (18 MΩ) was stirred by stir bar at room temperature (~25° C.) at 275 rpm.
2) 0.260 g calcium hydroxide ($Ca(OH)_2$) was added to the stirred $H_2O$ until dissolved.
3) 0.243 g magnetite NPs ($Fe_3O_4$) (98+% purity, 20-30 nm diameter) was added to the $Ca(OH)_2$ solution and let stir for 1 min.
4) 0.263 g titanium dioxide ($TiO_2$) nanopowder (anatase, 99.7% purity, <25 nm diameter) was added to the stirred solution and let stir for 1 min.
5) 0.408 g potassium phosphate ($KH_2PO_4$) was dissolved separately in 50 mL deionized $H_2O$ (18 MΩ). The $KH_2PO_4$ solution was then added dropwise over 2 min to the stirred solution.

6) pH of the solution after steps 1)-5) was measured at 10. A solution of 10% hydrochloric acid (HCl) in deionized (18 MΩ) $H_2O$ was used to reduce pH to 7.5.
7) The final solution was stirred for 1 wk at 25° C. and 275 rpm.
8) After 1 wk, TiHAMNPs were centrifuged at 2500 rpm for 10 min before supernatant fluid above the pellet was removed and replaced with deionized $H_2O$ (18 MΩ). Concentration of the particles was determined by drying in a weigh boat under constant ventilation and weighing. Final concentration of the TiHAMNPs is adjusted to around 3 mg/mL.
9) The final solution is autoclaved for 40 min to sterilize.

TiHAMNPs were characterized by FESEM and EDS to examine morphology and bulk composition. Results showed that TiHAMNPs were approximately 20-50 nm in diameter (FIG. 1, A). TiHAMNPs and SiMNPs were uniform across the samples examined. EDS analysis of the FESEMs for TiHAMNPs indicated all assumed elements were present, while any unexpected elements were not observed (FIG. 1, B). It was assumed that TiHAMNPs were composed of magnetite, HA, and $TiO_2$ as distinct compounds making up the particle structure. This assumption was based on reports of HA forming on the surface of magnetite NPs (Mondal et al., 2017), and $TiO_2$ dispersion on the surface of HA by simple stirring/heating methods (Lee et al., 2018).

Figure 3:
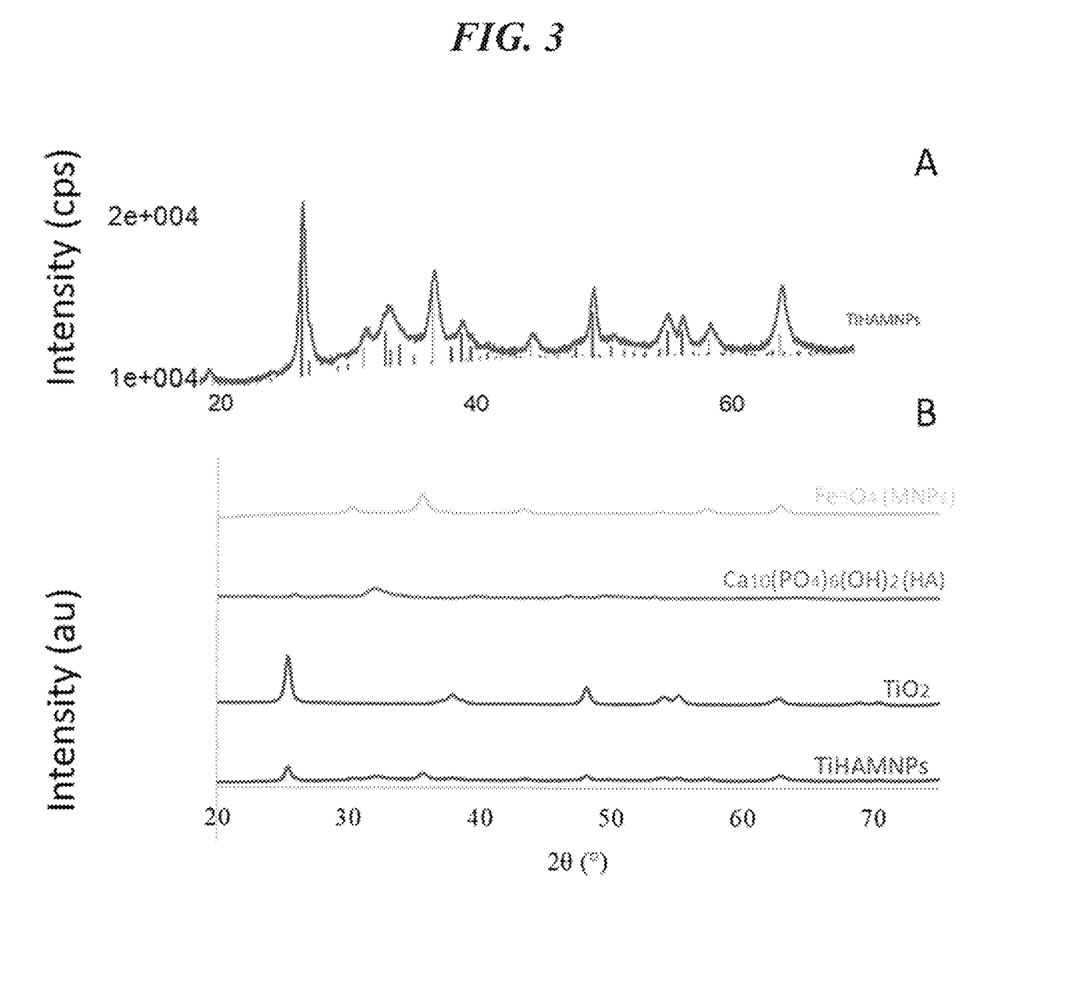

X-Ray Diffraction analysis of TiHAMNPs as compared to the exact precursors used during synthesis revealed excellent fit with a Rietveld Refinement (Rwp) value of 1.35%. Peak values also showed a strong visual match between the three individual pre-cursors and final TiHAMNP structure, with little to no loss of significant peaks. This provided evidence of the layered NP structure as predicted, with each precursor maintaining its original form as added during synthesis (see FIG. 3).

Figure 4:
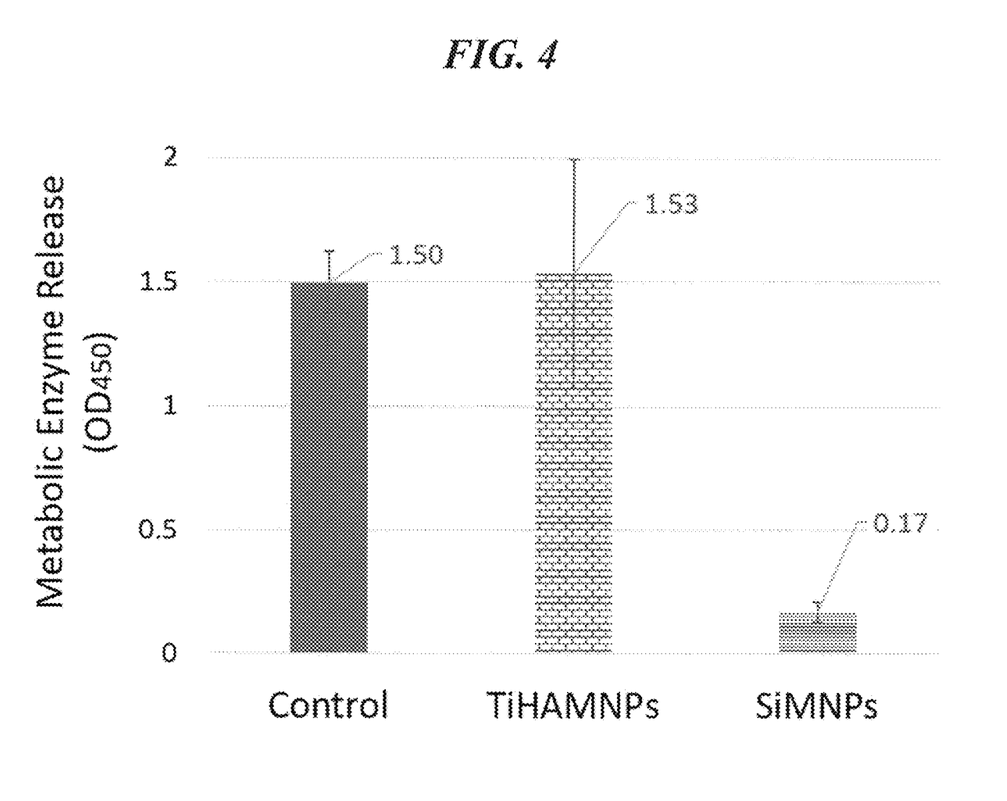

Two common assays were used to examine the biocompatibility of TiHAMNPs. First, a lactate dehydrogenase (LDH) release assay was used. The LDH assay examines release of LDH which occurs due to cellular damage. In these tests, a positive control consisting of deliberately ruptured cells and a negative control consisting of cells grown normally in medium were used to calculate a % cytotoxicity of the test material. Results from these tests showed that at 1.0 g/L SiMNPs exhibited a cytotoxicity of 11.06%, while TiHAMNPs exhibited a cytotoxicity of 4.54% when exposed to a layer of African green monkey kidney cells (Vero). In the second assay, enzyme release from cells was monitored. This metabolic assay (XTT assay) allowed comparison of cell health between mammalian cells that had been exposed to NPs vs not been exposed to NPs (FIG. 4). In those tests, a statistically significant diminishment of cell health was observed when the mammalian cell line had been exposed to SiMNPs for 24 hr as compared to both TiHAMNPs. No statistically significant difference in cell health was observed between the healthy control cells and cells exposed to TiHAMNPs (p=0.791).

Results from these studies are encouraging and indicate high biocompatibility of TiHAMNPs. Importantly however, it should be noted that extended use of TiO2 NPs has raised concern due to nanotoxicity induced by oxidative stress under UV light, resulting in formation of reactive oxygen species (Rashid et al., 2021). Although we did not use these methods here, green nanotechnology methods have been and should be employed during synthesis of TiO2 as a precursor for TiHAMNP synthesis in the future. These processes are efficient, reduce the number of precursors required, and can employ the use of natural organisms such as plants, bacteria, or proteins for TiO2 NP synthesis (Irshad et al., 2021).

Figure 5:
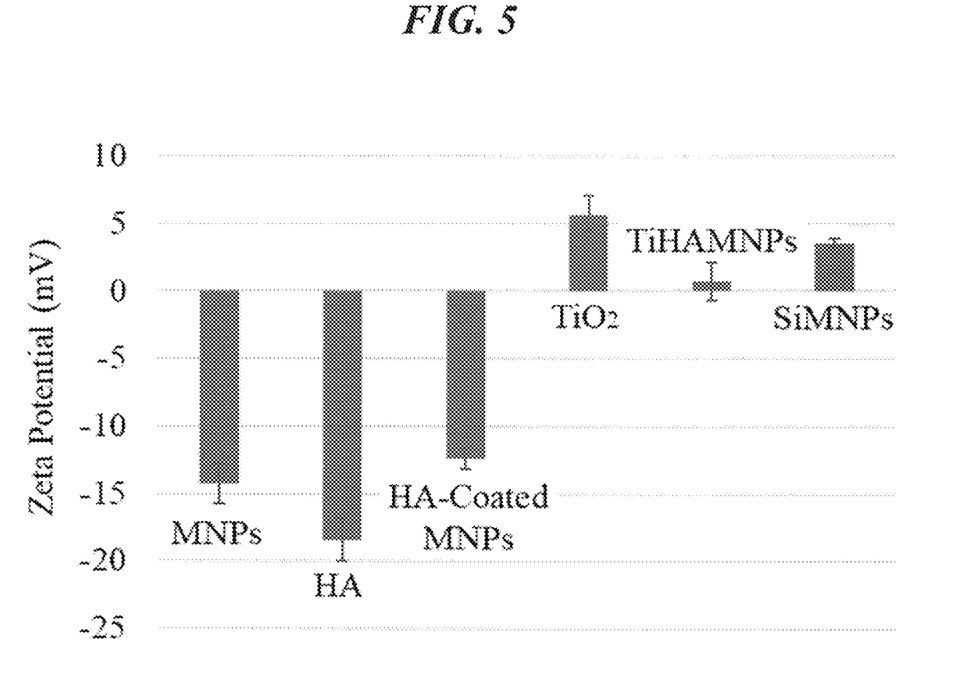
FIG. 5. Zeta potential measurements of TiHAMNPs along with precursors and SiMNPs. Results show that the final $TiO_2$ nanopowder coating of the particles increased zeta potential of the TiHAMNPs significantly. TiHAMNPs exhibited a slightly more neutral surface charge than SiMNPs. Neutral surface charge is relevant to preventing unwanted environmental reactions and cellular damage.

TiHAMNPs can be stored at room temperature and are stable as demonstrated by zeta potential measurements that show TiHAMNPs have a near neutral surface charge (see FIG. 5). Neutral surface charge is relevant to preventing unwanted environmental reactions and cellular damage.

Figure 6:
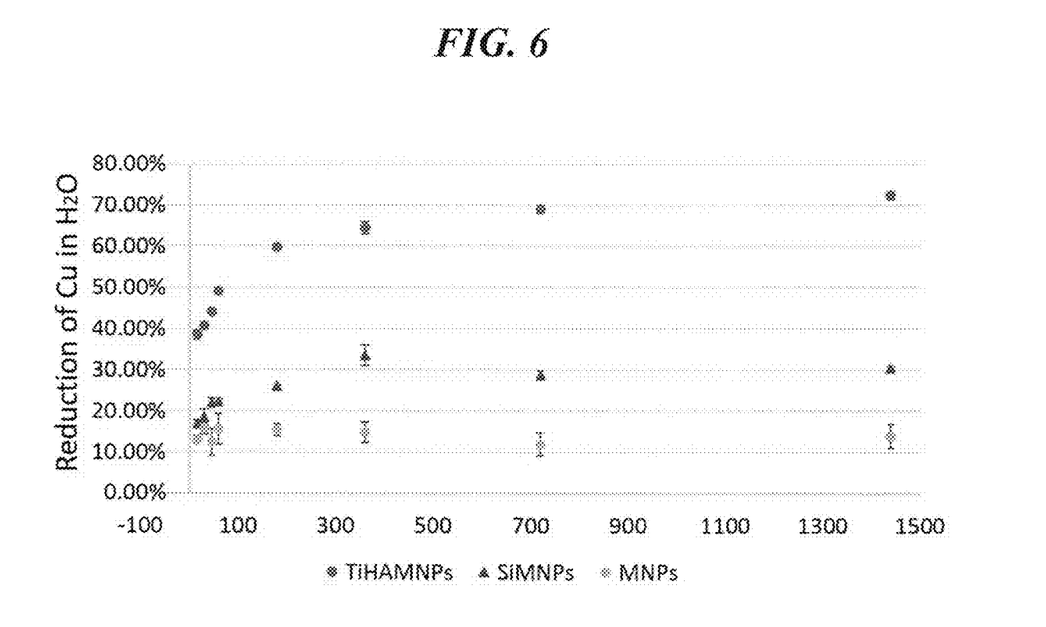

Adsorption studies show that TiHAMNPs exhibit significantly higher adsorption of Cu after 24 hr as compared to SiMNPs (p<0.001) commonly used for metals collection, as well as magnetite NPs alone which have also been used (p<0.001) (see FIG. 6). This result provides good evidence that TiHAMNPs can be used not only as an effective metals collection material, but that TiHAMNPs are efficient adsorbers of metals (as compared to alternatives) after just 24 hr.

Figure 7:
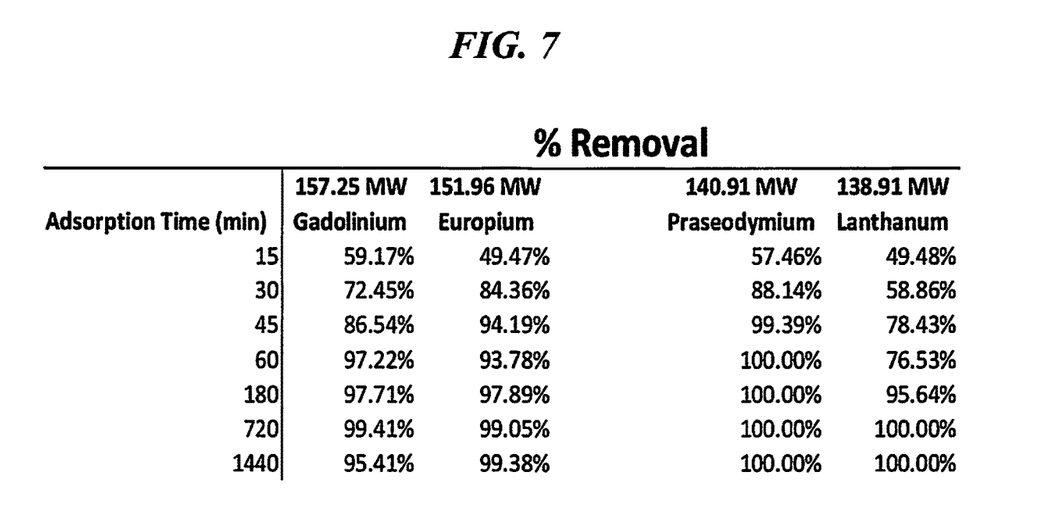
FIG. 7. Preliminary tests were performed to examine removal of rare earth elements (REE's). In this adsorptive test, removal of Gd (heavy), Eu (heavy), Pr (light), and La (light) was monitored over 24 hr. Most promising, TiHAMNPs removed 97.22% Gd, 93.78% Eu, and 100% Pr, while leaving 23.47% La in solution after 60 min. The difference in collection efficiencies indicates potential for selective separation.

In addition to Cu removal, preliminary tests were performed to examine removal of rare earth elements (REE's). REE's are critical to production of high-tech materials, and industrial development in the areas of green energy and communications is becoming increasingly dependent on efficient extraction of these elements (Asadollahzadeh et al., 2020; Voncken, 2016). REE's have similar physical and chemical properties (Gupta and Krishnamurthy, 1992) and are difficult to separate at feasible cost. REE's are divided into light and heavy groups (Goodenough et al., 2018; Lima and Filho, 2016). In this adsorptive test, removal of Gd (heavy), Eu (heavy), Pr (light), and La (light) was monitored over 24 hr (FIG. 7). Most promising, TiHAMNPs removed 97.22% Gd, 93.78% Eu, and 100% Pr, while leaving 23.47% La in solution after 60 min (FIG. 7). The difference in collection efficiencies indicates potential for selective separation.

Figure 8:
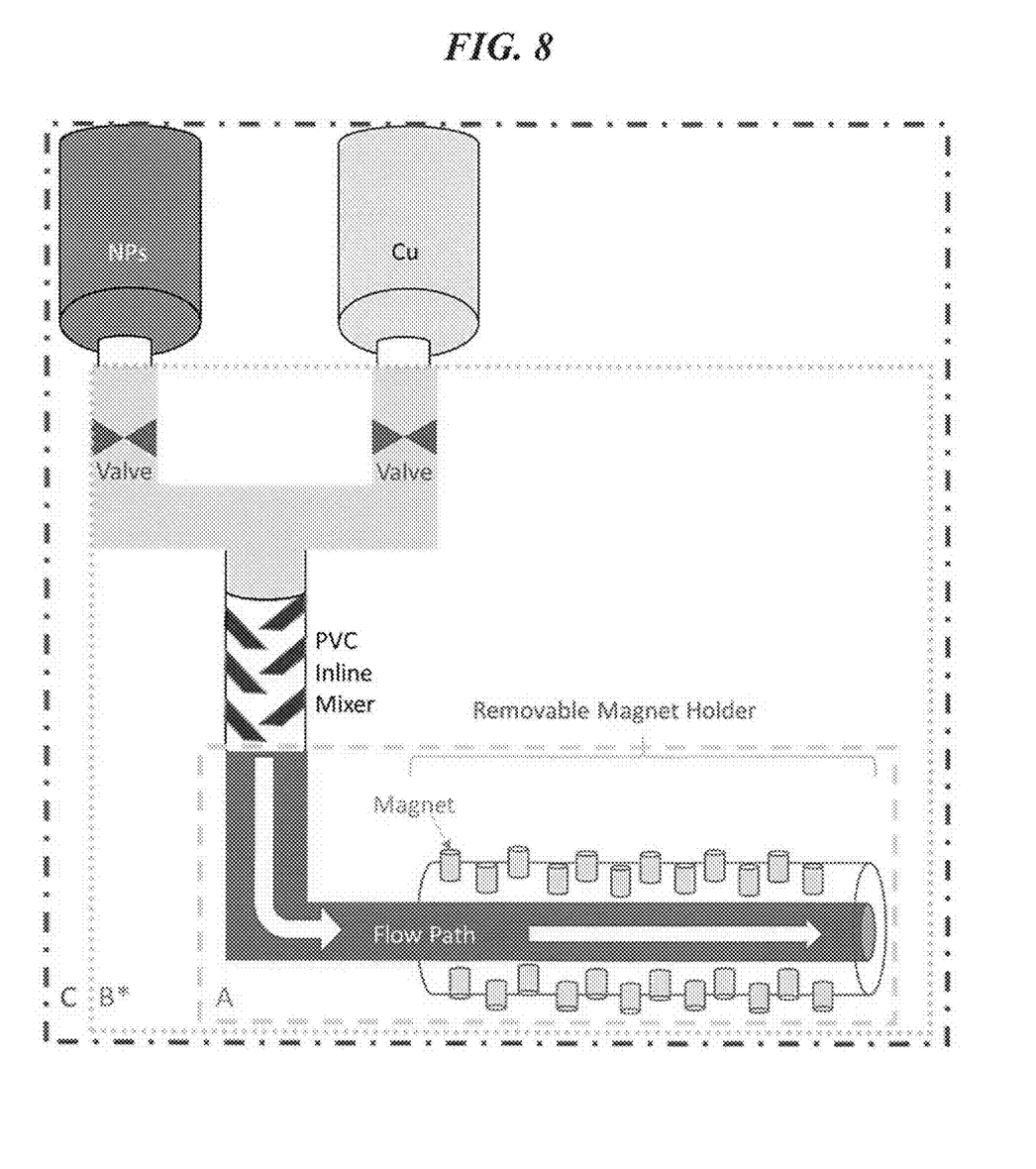

Testing of an in-line pipe metals collection system was performed by the addition of $TiO_2$-functionalized hydroxy apatite-coated magnetite nanoparticles (TiHAMNPs) to a liquid that contains an environmental sample. The two solutions are combined just before a manipulation stage of the system to produce a $TiO_2$-functionalized hydroxy apatite-coated magnetite nanoparticles (TiHAMNPs)-environmental sample mixture prior to introduction of the mixture to a manipulation stage of the system. The manipulation stage of the system is comprised of means for mechanical mixing, agitation, stirring, shaking, and any other means, which would increase contact between metal ions and sorbent particles (TiHAMNPs) to enable absorption of metals from the environmental sample to said $TiO_2$-functionalized hydroxy apatite-coated magnetite nanoparticles (TiHAMNPs). Once the solution mixture has been sufficiently manipulated, the solution travels to the collection stage of the system, wherein metals are collected. In the embodiment described herein, the collection stage is comprised of a plurality of magnets, which the solution mixture travels through.

Total Cu recovery tests using the described in-line pipe metals collection system (FIG. 8) were performed by the addition of a Cu solution (1 L at 0.1 g/L) environmental sample and TiHAMNPs (1 L at 1.0 g/L) solution into the system simultaneously. The two solutions are combined to a mixture just before the manipulation stage of the system. In this embodiment, the manipulation stage of the system was comprised of a static mixer, which improves contact between metal ions and sorbent particles (TiHAMNPs). Other embodiments of the manipulation stage of the system include mechanical mixing, agitation, stirring, shaking, and any other means, which would contact between metal ions and sorbent particles. Once the solution mixture is sufficiently manipulated, the solution travels to the collection stage of the system, wherein the metals are collected. In the embodiment described herein, the collection stage is comprised of a plurality of magnets, which the solution travels through. Samples of the depleted solution mixture were collected leaving the system and therefore provided a direct measurement of the Cu not collected by the NPs. These collection values were subtracted from control values of Cu solutions prepared in the same manner and run through the system without the TiHAMNPs present. Results showed a collection efficiency of 46.86% through the system at a flow rate of 103.4 cm/sec and an average residence time of 0.30 sec.

In the above described in-line pipe metals collection system, gravitational pressure was used to force the aqueous Cu solution and TiHAMNPs mixture through the system. In industrial applications, such a system may be laid flat on the ground or earth in a horizontal configuration rather than a vertical configuration in order to lower environmental impact on the landscape among other reasons. In such an embodiment, the addition of induced pressure means by a mechanical pump, pressurized gas, or other similar induced pressure means, opposed to gravitational force, would be required to force sample through the metals collection pipeline.

It is understood that the foregoing examples are merely illustrative of the present invention. Certain modifications of the compositions and/or methods may be made and still achieve the objectives of the invention. Such modifications are contemplated as within the scope of the claimed invention.

What is claimed is:

1. A composition for the extraction of metals from the environment comprising $TiO_2$-functionalized hydroxy apatite-coated magnetite nanoparticles (TiHAMNPs).

2. The composition for the extraction of metals from the environment of claim 1 wherein the precursors of said $TiO_2$-functionalized hydroxy apatite-coated magnetite nanoparticles (TiHAMNPs) are comprised of deionized $H_2O$, calcium hydroxide ($Ca(OH)_2$), magnetite NPs ($Fe_3O_4$), and titanium dioxide ($TiO_2$) nanopowder, potassium phosphate ($KH_2PO_4$).

3. A method for extracting metals from the environment comprising the steps of:
   A. Addition of the $TiO_2$-functionalized hydroxy apatite-coated magnetite nanoparticles (TiHAMNPs) of claim 1 to a liquid that contains an environmental sample to produce a $TiO_2$-functionalized hydroxy apatite-coated magnetite nanoparticles (TiHAMNPs)-environmental sample mixture;
   B. Manipulation of said $TiO_2$-functionalized hydroxy apatite-coated magnetite nanoparticles (TiHAMNPs)-environmental sample mixture to enable absorption of a metal from said environmental sample to said $TiO_2$-functionalized hydroxy apatite-coated magnetite nanoparticles (TiHAMNPs); and
   C. Collection of said $TiO_2$-functionalized hydroxy apatite-coated magnetite nanoparticles (TiHAMNPs) containing absorbed said metal.

4. The method for extracting metals from the environment of claim 3, further comprising the step of synthesizing said $TiO_2$-functionalized hydroxy apatite-coated magnetite nanoparticles (TiHAMNPs) by wet chemical precipitation methods.

5. The method for extracting metals from the environment of claim 4, wherein said wet chemical precipitation methods is comprised of the following steps:
   A. creating a solution by adding an amount of deionized $H_2O$ and stirring;
   B. adding an amount of calcium hydroxide ($Ca(OH)_2$) to said deionized $H_2O$ and stirring until dissolved;
   C. adding an amount of magnetite NPs ($Fe_3O_4$) and stirring;
   D. adding an amount of titanium dioxide ($TiO_2$) nanopowder and stirring;
   E. dissolving an amount of potassium phosphate ($KH_2PO_4$) in a separate amount of deionized $H_2O$ to create a $KH_2PO_4$ solution and adding said $KH_2PO_4$ solution to said solution to create a mixture;
   F. reducing the pH of said mixture to approximately 7.5 to create a final solution;
   G. stirring said final solution; and
   H. centrifuging said final solution until a pellet of $TiO_2$-functionalized hydroxy apatite-coated magnetite nanoparticles (TiHAMNPs) has formed.

6. The method for extracting metals from the environment of claim 3, wherein said environmental sample is comprised of water.

7. The method for extracting metals from the environment of claim 3, wherein said environmental sample is comprised of soil.

8. The method for extracting metals from the environment of claim 3, wherein said environmental sample is comprised of biological materials.

9. The method for extracting metals from the environment of claim 3, wherein said absorbed metal is comprised of copper.

10. The method for extracting metals from the environment of claim 3, wherein said absorbed metal is comprised of a rare earth element.

11. The method for extracting metals from the environment of claim 3, wherein the manipulation step of said $TiO_2$-functionalized hydroxy apatite-coated magnetite nanoparticles (TiHAMNPs)-environmental sample mixture is comprised of any means to increase contact between said $TiO_2$-functionalized hydroxy apatite-coated magnetite nanoparticles (TiHAMNPs) and said metal from said environmental sample mixture.

12. The method for extracting metals from the environment of claim 3, wherein the manipulation step of said $TiO_2$-functionalized hydroxy apatite-coated magnetite nanoparticles (TiHAMNPs)-environmental sample mixture is comprised of an inline mixer.

13. The method for extracting metals from the environment of claim 3, wherein the collection step is comprised of the $TiO_2$-functionalized hydroxy apatite-coated magnetite nanoparticles (TiHAMNPs)-environmental sample mixture travelling through a plurality of magnets.

14. The method for extracting metals from the environment of claim 3, wherein the addition, manipulation, and collection steps are contained within an inline pipe system.

15. The method for extracting metals from the environment of claim 3, further comprising an induced pressure means, whereby said induced pressure means force said $TiO_2$-functionalized hydroxy apatite-coated magnetite nanoparticles (TiHAMNPs)-environmental sample mixture through said addition, manipulation, and collection steps.

* * * * *